United States Patent
Guo et al.

(10) Patent No.: US 12,311,458 B2
(45) Date of Patent: May 27, 2025

(54) METHOD FOR IMPROVING SURFACE QUALITY OF ALLOY MICRO-AREA VIA SUPERSATURATED FILM AND USE THEREOF

(71) Applicants: QINGDAO UNIVERSITY OF TECHNOLOGY, Qingdao (CN); NORTHWESTERN POLYTECHNICAL UNIVERSITY, Xi'an (CN)

(72) Inventors: Pengfei Guo, Qingdao (CN); Lin Wu, Qingdao (CN); Jiachang Wang, Qingdao (CN); Yansong Liu, Qingdao (CN); Xin Lin, Xi'an (CN); Hongbo Lan, Qingdao (CN)

(73) Assignees: QINGDAO UNIVERSITY OF TECHNOLOGY, Qingdao (CN); NORTHWESTERN POLYTECHNICAL UNIVERSITY, Xi'an (CN)

( * ) Notice: Subject to any disclaimer, the term of this patent is extended or adjusted under 35 U.S.C. 154(b) by 0 days.

(21) Appl. No.: 17/907,428

(22) PCT Filed: Jan. 19, 2022

(86) PCT No.: PCT/CN2022/072777
§ 371 (c)(1),
(2) Date: Sep. 27, 2022

(87) PCT Pub. No.: WO2023/019882
PCT Pub. Date: Feb. 23, 2023

(65) Prior Publication Data
US 2024/0424586 A1    Dec. 26, 2024

(30) Foreign Application Priority Data
Aug. 17, 2021    (CN) .......................... 202110943626.6

(51) Int. Cl.
*B23H 3/08*    (2006.01)
*B33Y 40/20*    (2020.01)

(52) U.S. Cl.
CPC ................ *B23H 3/08* (2013.01); *B33Y 40/20* (2020.01); *B23H 2200/00* (2013.01)

(58) Field of Classification Search
None
See application file for complete search history.

(56) References Cited

U.S. PATENT DOCUMENTS

| | | | | |
|---|---|---|---|---|
| 7,422,677 | B2 * | 9/2008 | Mazur | ...................... C25F 3/02 205/663 |
| 2004/0050715 | A1 | 3/2004 | Zhu et al. | |
| 2016/0256945 | A1 * | 9/2016 | Goto | ........................ B23H 3/10 |
| 2020/0385883 | A1 * | 12/2020 | Cao | .......................... B22F 10/62 |
| 2023/0065692 | A1 * | 3/2023 | Mitchell-Smith | ........ B23H 3/10 |

FOREIGN PATENT DOCUMENTS

| | | |
|---|---|---|
| CN | 103360695 A | 10/2013 |
| CN | 105624770 A | 6/2016 |
| CN | 107335450 A | 11/2017 |
| CN | 108914167 A | 11/2018 |
| CN | 110607541 A | 12/2019 |
| CN | 112008166 A | 12/2020 |
| CN | 113618177 A | 11/2021 |

OTHER PUBLICATIONS

International Search Report dated May 12, 2022 in corresponding International Application No. PCT/CN2022/072777, 4 pages.
First Chinese Office Action dated Mar. 16, 2022 in corresponding Chinese Application No. 202110943626.6, 4 pages.

* cited by examiner

*Primary Examiner* — Brian W Cohen
(74) *Attorney, Agent, or Firm* — MH2 TECHNOLOGY LAW GROUP LLP

(57) ABSTRACT

Disclosed are a method for improving a surface quality of an alloy micro-area via a supersaturated film and use thereof. The method includes: adding nickel chloride to a sodium chloride-ethylene glycol electrolyte until the electrolyte is saturated, and conducting electrochemical machining.

7 Claims, No Drawings

METHOD FOR IMPROVING SURFACE QUALITY OF ALLOY MICRO-AREA VIA SUPERSATURATED FILM AND USE THEREOF

CROSS REFERENCE TO RELATED APPLICATION

This application is a national stage entry under 35 U.S.C. § 371 of PCT Application No. PCT/CN2022/072777 entitled "METHOD FOR IMPROVING SURFACE QUALITY OF ALLOY MICRO-AREA VIA SUPERSATURATED FILM AND USE THEREOF" filed on Jan. 19, 2022, which claims the benefit of Chinese Application No. 2021109436266 filed on Aug. 17, 2021, the disclosures of which are hereby incorporated by reference in their entireties.

TECHNICAL FIELD

The present disclosure relates to the technical field of electrochemical machining (ECM) of laser additive manufacturing transition alloys, in particular to a method for improving a surface quality of an alloy micro-area via a supersaturated film and use thereof.

BACKGROUND ART

The information disclosed in this background is merely for the purpose of facilitating the understanding of the general background of the present disclosure, and is not necessarily regarded as an acknowledgment or any form of implication that the information constitutes the prior art already known to those of ordinary skill in the art.

Laser solid forming (LSF) technology, as an advanced additive manufacturing technology, could achieve high-performance, fully dense, and near net shape forming of large, complex, and difficult-to-machine metal components. Therefore, the LSF technology is widely used in fields such as aviation, aerospace, navigation, and nuclear power. Nickel-based superalloys have attracted much attention due to their excellent mechanical properties, desirable microstructure stability, and high oxidation resistance. At present, the LSF technology has been proved to be one of the effective machining methods for large-scale nickel-based superalloy complex components. However, LSF-formed nickel-based superalloy components have an extremely poor surface quality, and must undergo surface treatment before application. As typical difficult-to-machine materials, the nickel-based superalloys during traditional machining (such as turning, milling, planing, and grinding) are prone to problems such as low machining efficiency, poor surface quality, and severe tool wear. Electrochemical machining (ECM) technology, characterized by removal of materials through electrochemical anodic dissolution, could get rid of limitations of mechanical properties such as strength and hardness of the materials. This technology could realize high-efficiency, low-cost, and tool and electrode wear-free machining, and has been widely used in the follow-up machining methods of large LSF-formed components.

At present, in ECM, an aqueous neutral salt solution is generally used as an electrolyte. Generally, when being anodicly dissolved in an aqueous electrolyte, metals are easy to form a transpassive film on a surface, resulting in low machining efficiency, poor surface quality, and unstable machining during the ECM. Relatively high current density could effectively promote the removal of transpassive film on the surface. However, metal ions in the aqueous electrolyte have an extremely high solubility, and the electrolyte generally has a high flow rate (greater than 10 m/s). Therefore, the metal ions on a surface of the nickel-based superalloy may be quickly taken away by the electrolyte, and are not easy to deposit on a sample surface to form a supersaturated film, leading to a relatively poor surface quality. It should be pointed out that during the LSF, non-equilibrium rapid solidification of a laser molten pool makes a microstructure of an as-deposited nickel-based superalloy contain a large number of irregularly-shaped secondary-phase particles (Laves phase and carbide phase) with stable electrochemical performance and a niobium-rich region. When ECM is conducted with an aqueous electrolyte, a machined surface of an anode material is rough even at a high current density. The reason may be that uneven fracture of the transpassive film formed on a surface of the microstructure results in different anodic dissolution rate for each component (for example, the highest dissolution rate for the niobium-rich region, followed by a γ matrix phase, and the lowest dissolution rate for a secondary phase), causing obvious micro-area unevenness on the surface. It can be easily seen that when using the aqueous electrolyte for ECM, the surface quality is easily affected by an internal microstructure of the anode material, especially for the LSF-formed nickel-based superalloy components with complex microstructures.

To improve the surface quality of a workpiece, the prior art disclosed a technical solution for improving a surface quality during machining by replacing an aqueous electrolyte with a sodium chloride-ethylene glycol electrolyte. By using the ethylene glycol electrolyte, the technical solution could effectively avoid formation of a transpassive film when the aqueous electrolyte is used as an electrolyte, thereby significantly improving problems of low machining efficiency, poor surface quality, and unstable machining during ECM. This technical solution could indeed improve the surface quality of a workpiece to a certain extent. However, this technical solution has an extremely complicated process and requires reciprocating scanning and machining. Moreover, the prior art only stops here for the subsequent surface treatment of formed components, and it is found that there are still a series of problems on the surface of a workpiece after ECM using the sodium chloride-ethylene glycol as an electrolyte.

The present inventors have found that even if a sodium chloride-ethylene glycol solution is used as an electrolyte instead of an aqueous salt solution, the surface of a workpiece after ECM still has micro-area unevenness. This is because there are still differences in the dissolution rates between different constituent phases and the segregated region in the microstructure. The poor surface quality of micro-area may reduce a service life of the alloy and limit further use of alloy materials including the nickel-based superalloy.

SUMMARY

Although there have been a lot of studies on ECM of alloys using a sodium chloride-ethylene glycol electrolyte, and a better surface quality has been achieved by specific ECM processes, however, these studies are only for single-phase alloys (TiAl) or two-phase alloys (titanium alloys), and these ECM processes are relatively complex (such as a higher feed rate and reciprocating scanning). As for the LSF-formed nickel-based superalloy components (γ matrix/secondary phase/niobium-rich region) with extremely uneven microstructure, ECM using the sodium chloride-ethylene glycol electrolyte does not provide an ideal surface quality.

Nevertheless, the present inventors have found that using the sodium chloride-ethylene glycol electrolyte for ECM could indeed improve a surface quality of the LSF-formed nickel-based superalloy. However, after careful studies, it is found that the surface of alloy after ECM still has micro-area unevenness and is accompanied by weak defects. It is speculated that these defects may be related to the uneven microstructure. It can be seen that there is still a poor surface quality of micro-areas of the alloy workpiece. Micro-area defects seriously and negatively affect a service life of alloy components, especially used in places subjected to dynamic loads. These micro-area defects could easily induce crack initiation.

Clearly, it is profound and significant for the research that the present inventors found the problems that there are still surface micro-area defects and poor surface quality of the component after ECM using the sodium chloride-ethylene glycol solution as an electrolyte.

To solve the above problems, the present disclosure provides a method for improving a surface quality of an alloy micro-area via a supersaturated film and use thereof. In the present disclosure, a supersaturated film is formed on a surface of a workpiece, which allows micro-area dissolution to be precisely controlled, such that a surface quality of micro-areas of the workpiece is further improved, thereby prolonging the service life of the alloy component.

Specifically, the present disclosure provides the following technical solutions.

The present disclosure provides a method for improving a surface quality of an alloy micro-area via a supersaturated film, including:

adding nickel chloride to a sodium chloride-ethylene glycol electrolyte until the electrolyte is saturated, and conducting ECM.

The present disclosure further provides an alloy component prepared by the above method, where the alloy component has a surface roughness Ra of 0.005 μm to 0.04 μm.

The present disclosure further provides use of the above method in ECM of an LSF-formed alloy.

The present disclosure further provides use of the above alloy component in manufacture of an engine, a gas turbine, or a nuclear reactor.

One or more embodiments in the present disclosure have the following beneficial effects:

(1) In the present disclosure, it is found that even if ECM is conducted using the sodium chloride-ethylene glycol, the surface of an alloy workpiece still has micro-area defects, poor micro-area quality, and a complicated machining process. However, in the prior art, the surface of an alloy after ECM has not been further studied, and the above-mentioned problems are not recognized. It can be seen that the finding of the above-mentioned problems in the present disclosure is very important and innovative, which has a far-reaching significance for promoting further use of the alloy component.

(2) In the present disclosure, it is also found that during treating the alloy surface, an ethylene glycol electrolyte containing saturated nickel chloride and sodium chloride could inhibit the formation of transpassive film and impurities that cause micro-area defects. Moreover, metal nickel ions generated in the ECM have no time to diffuse, and could form a supersaturated film (mainly nickel chloride) on the surface of an alloy workpiece, which could effectively reduce the dissolution of concave areas and accelerate the dissolution of convex areas on the surface, such that the surface of micro-area becomes flat, thereby effectively avoiding the poor surface quality of the alloy micro-area in ECM.

(3) The problem of poor quality of alloy micro-areas is further solved by the above method. Compared with the prior art, a surface quality of micro-areas of an alloy workpiece is further improved, and a prepared alloy has a surface roughness Ra of 0.005 μm to 0.04 μm, which is far lower than that of an alloy treated with sodium chloride-ethylene glycol. Therefore, the quality of an alloy component is greatly improved.

(4) In the present disclosure, the prepared alloy component has a smooth and bright surface, without microscopic unevenness and weak defects. Therefore, devices prepared by the alloy component could have a relatively long service life.

DETAILED DESCRIPTION OF THE EMBODIMENTS

The present disclosure will be described in detail below with reference to specific embodiments. It should be understood that these embodiments are only intended to describe the present disclosure, rather than to limit the scope of the present disclosure. In the following examples, experimental methods in which specific conditions are not stated are generally carried out according to conventional conditions or according to the conditions recommended by the manufacturer.

Unless otherwise defined, all professional and scientific terms used herein have the same meaning as familiar to those skilled in the art. The reagents or raw materials used in the present disclosure can be purchased through conventional channels. Unless otherwise specified, the reagents or raw materials in the present disclosure are used in a conventional manner in the field or in accordance with the product instructions. In addition, any methods and materials similar or equivalent to those described in the present disclosure could be used in the methods of the present disclosure. Preferred embodiments and materials described herein are for illustrative purposes only.

It should be noted that the terms used herein are merely used for describing specific embodiments, but not intended to limit the exemplary embodiments according to the present disclosure. As used herein, a singular form is intended to include a plural form unless otherwise indicated explicitly in the context. Furthermore, it should be further understood that the terms "includes/comprises/contains" and/or "including/comprising/containing" used in this specification indicate the presence of features, steps, operations, and/or combinations thereof.

At present, the prior art has not found that after ECM of an LSF-formed nickel-based superalloys using sodium chloride-ethylene glycol as an electrolyte, there are still problems of micro-area defects and poor surface quality of the micro-areas, thus affecting the service life of alloy components. Therefore, the present disclosure provides a method for improving a surface quality of an alloy micro-area via a supersaturated film and use thereof.

The present disclosure provides a method for improving a surface quality of an alloy micro-area via a supersaturated film, including:

adding nickel chloride to a sodium chloride-ethylene glycol electrolyte until the electrolyte is saturated, and conducting ECM.

In some embodiments, the sodium chloride-ethylene glycol electrolyte is further added with chromium trichloride and/or ferrous chloride: chromium trichloride or ferrous chloride brings a synergistic effect with nickel chloride, which is beneficial to further promoting the formation of a supersaturated film.

Sodium chloride could improve the electrical conductivity of ethylene glycol solution; the ethylene glycol solution avoids the formation of oxides and hydroxides on the surface of a workpiece during ECM, which contributes to a smooth surface. Nickel chloride could effectively inhibit the diffusion of metal ions (mainly nickel ions) on the surface of a workpiece during the ECM without being carried away by the electrolyte, such that it is easier to induce the formation of a saturated film on the surface. The supersaturated film significantly improves the surface quality of alloy micro-areas.

A conventional inventive concept of using a sodium chloride-ethylene glycol as an electrolyte for ECM to improve surface quality is to avoid the generation of transpassive films on the surface during machining, thereby avoiding the selective dissolution of anode workpieces due to destruction by the transpassive films. However, different from the conventional concept, in the present disclosure, by promoting the formation of a supersaturated film during the ECM, a dissolution rate of each micro-area in a ternary system including γ matrix/secondary phase/niobium-rich region could be precisely controlled, which well solves the problem of poor quality of micro-areas.

Therefore, the present inventor not only found the new problem of poor quality of micro-areas on an alloy surface, but also proposed a new method for solving the problem of poor quality of micro-areas via the supersaturated film.

The supersaturated film-based ECM may be conducted by following two routes:

I. A surface of an LSF-formed nickel-based superalloy component is machined directly using a direct-current power source. Direct-current electrochemical machining (DECM) is conducted at a voltage of 20 V to 30 V, a machining gap of 0.3 mm to 0.7 mm, an electrolyte flow rate of 5 ml/s to 10 ml/s, and a feed rate of 1 mm/s to 10 mm/s, using an ethylene glycol electrolyte containing saturated nickel chloride and sodium chloride. Optimally, the DECM is conducted at the voltage of 24 V, the machining gap of 0.5 mm, and the electrolyte flow rate of 5 ml/s, using the ethylene glycol electrolyte containing saturated nickel chloride and sodium chloride.

II. A surface of an alloy component is machined directly using a nanosecond-pulse power source. Nanosecond pulse electrochemical machining (PECM) is conducted at an initial machining gap of two poles of 1 µm to 3 µm, an electrolyte flow rate of 5 ml/s to 15 ml/s, a pulse voltage of 10 V to 24 V, a pulse width of 1 ns to 100 ns, a duty cycle of 30% to 60%, and a feed rate of 1 mm/s to 10 mm/s, using a sodium chloride-ethylene glycol electrolyte containing saturated nickel chloride. To optimize the surface of an alloy component and improve the quality of the alloy component, optimally, the PECM is conducted at the initial machining gap of two poles of 2 µm, the electrolyte flow rate of 5 ml/s, the pulse width of 3 ns, the duty cycle of 50%, and the feed rate of 2 mm/s, using the sodium chloride-ethylene glycol electrolyte containing saturated nickel chloride.

An LSF-formed Inconel 718 nickel-based superalloy has serious unevenness in surface micro-areas of ECM, limiting further use of the nickel-based superalloy. Therefore, it has important application values that the alloy in the present disclosure is preferably a nickel-based superalloy.

The present disclosure further provides an alloy component prepared by the above method, where the alloy component has a smooth and bright surface with a roughness Ra of 0.005 µm to 0.04 µm, without microscopic unevenness and weak defects. Obviously, the alloy component machined according to the present disclosure has a better surface quality, improved mechanical properties and a prolonged service life.

The present disclosure further provides use of the above method in ECM of an LSF-formed alloy.

The present disclosure further provides use of the above alloy component in manufacture of an engine, a gas turbine, or a nuclear reactor. The alloy component has a further improved surface quality, such that a service life of devices such as engines, gas turbines, and nuclear reactors assembled by the alloy component could be further improved.

In order to enable those skilled in the art to understand the technical solutions of the present disclosure more clearly, the technical solutions of the present disclosure will be described in detail below with reference to specific examples.

Example 1

A method for improving a surface quality of an alloy micro-area via a supersaturated film was provided, where a surface of an alloy component was directly subjected to DECM, specifically consisting of the following steps:

After an LSF-formed Inconel 718 alloy component was obtained, the alloy component was directly subjected to DECM. The DECM was conducted with a stainless steel tube electrode (outer diameter of 1.2 mm, inner diameter of 0.8 mm) as a tool electrode at an applied voltage of 24 V, a machining gap of 0.5 mm, a feed rate of 2 mm/s, and an electrolyte flow rate of 5 ml/s, using a sodium chloride-ethylene glycol electrolyte containing saturated nickel chloride. After completing one layer, a height of the tube electrode was adjusted to make the machining gap at 0.5 mm, and a new layer was started to machine. The above process was repeated until the remaining layers were completed.

Test results: the surface morphology of a sample was observed with a laser confocal microscope, and it can be directly observed that the component has a surface roughness Ra of 0.04 µm, without micro-area unevenness and micro-area defects.

Example 2

A method for improving a surface quality of an alloy micro-area via a supersaturated film was provided, where a surface of an alloy component was directly subjected to nanosecond PECM, specifically consisting of the following steps:

After an LSF-formed Inconel 718 alloy component was obtained, the alloy component was directly subjected to nanosecond PECM. Due to an uneven surface of the component, when using a stainless steel tube electrode (outer diameter of 1.2 mm, inner diameter of 0.8 mm) for machining, a highest point of a sample was used as a benchmark. Nanosecond PECM was conducted with a distance between an end face of the tube electrode and the highest point of the sample of 2 µm, at a feed rate in a horizontal plane of 2 mm/s, an electrolyte flow rate of 5 ml/s, an applied potential of 10 V, a pulse frequency of 10 ns, and a duty cycle of 50%, using a sodium chloride-ethylene glycol electrolyte containing saturated nickel chloride. After completing this layer, the tube electrode was lowered by a certain distance to ensure that the distance between the tube electrode and the surface of the sample was 2 μm. After completing one layer, the remaining layers were machined by the above parameters.

Test results: the surface morphology of a sample was observed with a laser confocal microscope, and it can be directly observed that the component has a surface roughness Ra of 0.1 μm, with micro-area unevenness and micro-area defects.

Data Analysis:

It can be seen from the comparison between Example 1 and Example 2 that nanosecond PECM has no obvious advantages in improving the surface roughness Ra and improving the surface quality of the alloy. However, due to an extremely low material removal rate, the PECM has a reduced machining efficiency and a high production cost, and the processed metal surface still has micro-area unevenness and micro-area defects.

Example 3

A method for improving a surface quality of an alloy micro-area via a supersaturated film was provided, where a surface of an alloy component was directly subjected to DECM, specifically consisting of the following steps:

After an LSF-formed Inconel 718 alloy component was obtained, the alloy component was directly subjected to DECM. The DECM was conducted with a stainless steel tube electrode (outer diameter of 1.2 mm, inner diameter of 0.8 mm) as a tool electrode, at an applied voltage of 24 V, a machining gap of 0.5 mm, a feed rate of 2 mm/s, and an electrolyte flow rate of 5 ml/s, using a sodium chloride-ethylene glycol electrolyte containing saturated nickel chloride and chromium trichloride. After completing one layer, a height of the tube electrode was adjusted to make the machining gap at 0.5 mm, and a new layer was started to machine. The above process was repeated until the remaining layers were completed.

Test results: the surface morphology of a sample was observed with a laser confocal microscope, and it can be directly observed that the component has a surface roughness Ra of 0.02 μm, without micro-area unevenness and micro-area defects.

Example 4

A method for improving a surface quality of an alloy micro-area via a supersaturated film was provided, where a surface of an alloy component was directly subjected to DECM, specifically consisting of the following steps:

After an LSF-formed Inconel 718 alloy component was obtained, the alloy component was directly subjected to DECM. The DECM was conducted with a stainless steel tube electrode (outer diameter of 1.2 mm, inner diameter of 0.8 mm) as a tool electrode, at an applied voltage of 24 V, a machining gap of 0.5 mm, a feed rate of 2 mm/s, and an electrolyte flow rate of 5 ml/s, using a sodium chloride-ethylene glycol electrolyte containing saturated nickel chloride, chromium trichloride and ferrous chloride. After completing one layer, a height of the tube electrode was adjusted to make the machining gap at 0.5 mm, and a new layer was started to machine. The above process was repeated until the remaining layers were completed.

Test results: the surface morphology of a sample was observed with a laser confocal microscope, and it can be directly observed that the component has a surface roughness Ra of 0.005 μm, without micro-area unevenness and micro-area defects.

Comparative Example 1

Comparative Example 1 was conducted as Example 1 except that the electrolyte was replaced with an ethylene glycol electrolyte containing saturated sodium chloride.

Test results: the surface morphology of a sample was observed with a laser confocal microscope, and it can be directly observed that the component has a surface roughness Ra of 0.25 μm, with micro-area unevenness and micro-area defects.

Data Analysis:

By comparing Example 1 and Comparative Example 1, it can be seen that by adopting the ethylene glycol electrolyte containing saturated nickel chloride and sodium chloride, it is very easy to form a supersaturated film on a surface of an alloy workpiece, thereby effectively avoiding the poor surface quality of micro-areas of the alloy by ECM. In addition, in Comparative Example 1, the reciprocating processing on the machining area has a complicated process, more reciprocation times, and low machining efficiency, while the surface quality of micro-area still cannot reach the level of Example 1. In Example 1, nickel chloride effectively avoids micro-area unevenness and micro-area defects on the surface of an alloy component after machining, thereby greatly improving the quality of alloy component and prolonging the service life.

The above description is only preferred examples of the present disclosure, and is not intended to limit the present disclosure. Although the present disclosure is expounded with reference to the above examples, a person skilled in the art could still make modifications on the technical solutions described in the above examples or equivalent substitutions on some technical features of the technical solutions. Any modifications, equivalent substitutions, improvements, and the like made within the spirit and principle of the present disclosure should be included within the protection scope of the present disclosure.

What is claimed is:

1. A method for improving a surface quality of an alloy micro-area via a supersaturated film, comprising:
adding nickel chloride to a sodium chloride-ethylene glycol electrolyte until the electrolyte is saturated, and conducting electrochemical machining (ECM).

2. The method for improving the surface quality of the alloy micro-area via the supersaturated film of claim 1, wherein the sodium chloride-ethylene glycol electrolyte is further added with chromium trichloride and/or ferrous chloride.

3. The method for improving the surface quality of the alloy micro-area via the supersaturated film of claim 1, wherein the ECM is conducted by direct-current electrochemical machining (DECM) or pulse electrochemical machining (PECM).

4. The method for improving the surface quality of the alloy micro-area via the supersaturated film of claim 1, wherein the alloy is selected from the group consisting of a solid solution-strengthened alloy, a precipitation-strengthened alloy, and a particle-enhanced metal matrix composite.

5. The method for improving the surface quality of the alloy micro-area via the supersaturated film of claim 4, wherein the precipitation-strengthened alloy is a nickel-based superalloy.

6. The method for improving the surface quality of the alloy micro-area via the supersaturated film of claim 3, wherein the DECM is conducted at a voltage of 20 V to 30 V, a machining gap of 0.3 mm to 0.7 mm, and an electrolyte flow rate of 5 ml/s to 15 ml/s.

7. The method for improving the surface quality of the alloy micro-area via the supersaturated film of claim 6, wherein the DECM is conducted at the voltage of 24 V, the machining gap of 0.5 mm, and the electrolyte flow rate of 5 ml/s.

\* \* \* \* \*